United States Patent
Keung

(10) Patent No.: US 7,385,833 B2
(45) Date of Patent: Jun. 10, 2008

(54) SNUBBER CIRCUIT FOR A POWER CONVERTER

(75) Inventor: Lee Tai Keung, Ma On Shan, N.T. (HK)

(73) Assignee: Astec International Limited, Hong Kong (HK)

( * ) Notice: Subject to any disclaimer, the term of this patent is extended or adjusted under 35 U.S.C. 154(b) by 167 days.

(21) Appl. No.: 11/144,935

(22) Filed: Jun. 3, 2005

(65) Prior Publication Data

US 2006/0274558 A1 Dec. 7, 2006

(51) Int. Cl.
*H02H 7/122* (2006.01)
*H02H 3/20* (2006.01)
*G05F 1/00* (2006.01)

(52) U.S. Cl. .................. 363/56.12; 323/222; 361/91.7

(58) Field of Classification Search ............. 363/56.12, 363/56.05, 56.08, 56.11; 323/222; 361/91.07
See application file for complete search history.

(56) References Cited

U.S. PATENT DOCUMENTS

| | | | |
|---|---|---|---|
| 5,633,579 A * | 5/1997 | Kim ........................ 323/222 |
| 5,636,114 A * | 6/1997 | Bhagwat et al. ......... 363/56.12 |
| 5,815,386 A * | 9/1998 | Gordon .................... 363/50 |
| 5,828,559 A | 10/1998 | Chen |
| 5,909,107 A * | 6/1999 | Aonuma et al. ............. 323/222 |
| 5,914,587 A * | 6/1999 | Liu ........................ 323/222 |
| 5,943,200 A * | 8/1999 | He ......................... 361/56 |
| 5,959,438 A * | 9/1999 | Jovanovic et al. .......... 323/222 |
| 6,008,630 A | 12/1999 | Prasad |
| 6,236,191 B1 * | 5/2001 | Chaffai ..................... 323/225 |
| 6,314,002 B1 * | 11/2001 | Qian et al. ............... 363/21.04 |
| 6,333,861 B1 | 12/2001 | Goodman |
| 6,341,076 B1 * | 1/2002 | Kadatskyy et al. ....... 363/56.12 |
| 6,421,255 B1 * | 7/2002 | Frebel et al. .................. 363/20 |
| 6,434,029 B1 * | 8/2002 | Cyr et al. ...................... 363/86 |
| 6,515,883 B2 * | 2/2003 | Wade .......................... 363/123 |
| 7,023,186 B2 * | 4/2006 | Yan ............................. 323/225 |
| 7,049,793 B2 * | 5/2006 | Itoh et al. .................... 323/222 |
| 7,161,331 B2 * | 1/2007 | Wai et al. .................... 323/222 |
| 7,233,507 B2 * | 6/2007 | Schenk .......................... 363/50 |
| 2004/0036451 A1 * | 2/2004 | Itoh et al. ..................... 323/225 |

\* cited by examiner

*Primary Examiner*—Jeffrey Sterrett
*Assistant Examiner*—Harry Behm
(74) *Attorney, Agent, or Firm*—Nixon Peabody LLP

(57) ABSTRACT

A snubber circuit and corresponding power converter topology for controlling the voltage across the resonant capacitor at turn on of a control switch so as to suppress a spike at the switch caused by the large current pulse and parasitic inductance of the power converter. The suppression of the spike reduces conduction losses and increases efficiency. According to one embodiment, the snubber circuit in a boost converter topology includes a second winding tapped from the main boost inductor and connected in series with a first diode and a second diode. A resonant capacitor and the second diode are connected in a series combination which is in parallel with the main boost diode. The second winding is connected in series with the first diode and the second diode between the output terminals of the converter. Alternatively, the snubber circuit is used in flyback, buck, and forward converter topologies.

5 Claims, 3 Drawing Sheets

SNUBBER CIRCUIT FOR A POWER CONVERTER

FIELD OF INVENTION

The present invention relates in general to DC-DC power converters, and more particularly to a snubber circuit used in power converters.

BACKGROUND OF THE INVENTION

A boost converter is a power converter where a smaller input DC voltage is increased to a desired DC voltage level at the converter's output. A typical prior art boost converter 10 is shown in FIG. 1. Boost converter 10 has input terminals 2, 4 for enabling an input voltage $V_{in}$ to be coupled to converter 10, and output terminals 6, 8 where the output DC voltage is provided. The boost converter 10 includes an inductor 18, to which the input voltage Vin is coupled, that is in series with a boost diode 16 connected to an output capacitor 12 across which the load (not shown) is connected at terminals 6, 8. A transistor switch 14 is connected to a node 15 between the inductor 18 and boost diode 16 and a ground return line 20 to provide regulation of the output voltage. The switch 14 is typically a MOSFET having a control input, a drain and a source terminal. A control circuit 42 (details not shown) is coupled to the control input for providing a control signal for controlling the timing of the on and off transition of the switch 14. The control circuit 42 typically includes a pulse width modulation circuit (PWM). In operation, when the switch 14 is on, the inductor current in inductor 18 increases, storing energy in its magnetic field. When the transistor switch 14 is off, this energy is transferred via the diode 16 to the output capacitor 12 and the load. Drawbacks of such conventional boost converter circuits include the creation of switch voltage and current stresses, which result in low efficiency power conversion.

FIG. 2 shows a prior art boost converter 20 having a snubber circuit 24 added to the boost converter 10 of FIG. 1. The snubber circuit 24 is designed to suppress the spike generated at the drain of MOSFET 14 caused by the large current pulse and the leakage (parasitic) inductance in the circuit when MOSFET 14 is turned off and to transfer this energy to the output. The snubber circuit 24 includes a series combination of a capacitor 22 and a diode 36 connected across a diode 16. The capacitor 22 is connected at one end to the junction of inductor 18 and diode 16 at a node 25. Snubber circuit 24 also includes a series combination of a diode 26 and an inductor 28 connected between the junction of the capacitor 22 and the diode 36 and the negative output terminal 8.

In operation, when the MOSFET switch 14 in boost converter 20 switches from ON to OFF, the spike that is created at node 25 is clamped due to the voltage across capacitor 22 which causes turn on of diode 36 before diode 16 is turned on. Thereafter, the voltage at node 25 will become slightly higher than the output voltage at terminal 6 causing diode 16 to conduct and transfer the energy stored in inductor 18 during turn ON and clamp the voltage of node 25 to $V_{out}$. Capacitor 22 and inductor 28 form a resonant network that, through half resonant action after MOSFET 14 is turned ON, reverses the polarity of the voltage across capacitor 22.

A drawback of the circuit in FIG. 2 is that the voltage across capacitor 22 cannot be controlled at turn on and so, after the half resonant period, the reverse voltage is less than before. The voltage across capacitor 22 cannot be controlled on turn on of MOSFET 14 because the energy stored in inductor 28 is not sufficiently controlled. Consequently, the performance of the circuit in FIG. 2 is not suitable, particularly in high power applications. For one exemplary converter in an experiment setup, just after the MOSFET 14 turns off, the voltage across capacitor 22 becomes +50V, and on turn on of MOSFET 14, after the half resonant period, the voltage across capacitor 22 becomes −40V. The voltage loss is due to the resonant choke, i.e., inductor 28 and diode 26. Thus, although an improvement over converter 10 of FIG. 1, converter 20 has the similar drawback of having an unacceptably high voltage spike (>$V_{out}$) at the drain of MOSFET 14 for high current applications so as to require higher voltage rated MOSFETS with higher $R_{dson}$ and corresponding higher conduction losses.

A need therefore exists for a snubber circuit and power converter topology which solves the above described drawbacks of the known circuits by controlling the voltage across the resonant capacitor at turn on of the main MOSFET so as to enable the use of lower voltage and lower $R_{dson}$ rated MOSFETs and to provide increased efficiency by reducing conduction losses.

SUMMARY OF THE INVENTION

The present invention overcomes the drawbacks of known circuit by providing a snubber circuit for reducing the voltage spike developed at the drain of the main MOSFET caused by the large current pulse and parasitic inductance of a power converter circuit. The spike suppression provided by the present invention results in much improved performance for the converter. The snubber circuit according to the present invention is a replacement for resonant snubber circuits used for boost, flyback, buck, and forward converters topologies.

An advantage of the present invention is that the voltage across the resonant capacitor is controlled such that, after the resonant action, it is higher than before. The voltage in the resonant capacitor circuit according to the present invention is well defined and can be easily controlled at turn ON by adjusting the turns ratio of the two inductor windings.

Another advantage of the present invention is that the drain voltage of the main MOSFET switch is clamped well to the output voltage so as to enable the use of much lower voltage and $R_{dson}$ MOSFET switches that are smaller and less costly which reduces switch conduction and turn on losses.

Another advantage of the present invention is that it reduces electromagnetic interference (EMI) since the size of the spike generated at the drain of MOSFET is reduced.

Broadly stated, the present invention provides a power converter having first and second input terminals where an input voltage is provided and first and second output terminals where the output DC voltage is provided, the converter comprising a first inductor having one end connected to the first input terminal; a boost diode connected in series between the first inductor and the first output terminal; a first capacitor coupled across the first output terminal and the second output terminal; a switch alternately switched on and off as a function of a control signal for controlling current through the first inductor; the switch is connected between the first input terminal and a first node at the junction of the first winding and the boost diode; and a snubber circuit comprising a series combination of a second inductor magnetically coupled to said first inductor, a second diode and a third diode connected between the output terminals; and a resonant capacitor connected in series with the third diode between the first node and the first output terminal.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein:

FIG. 4 is a schematic diagram of the equivalent effective circuit of FIG. 3 with the MOSFET turned on;

FIG. 7 is a schematic diagram of the equivalent effective circuit of FIG. 6 with the switch turned on;

FIG. 9 is a schematic diagram of the equivalent effective circuit of FIG. 8 with the switch turned on.

DETAILED DESCRIPTION OF THE INVENTION

The circuit and boost converter topology according to the present invention provides a resonant snubber for reducing the voltage spike developed in the drain of the main MOSFET switch caused by the large current pulse and the parasitic inductance.

Figure 1:
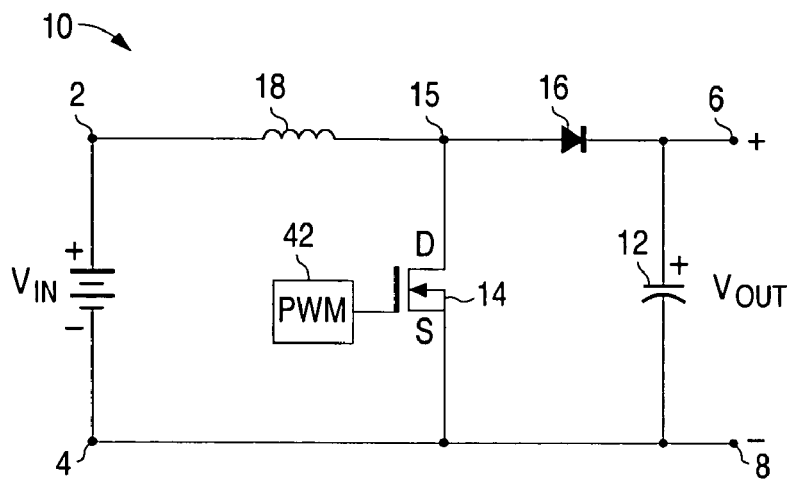
FIG. 1 is a schematic diagram of a power converter having a conventional boost topology.
Figure 2:
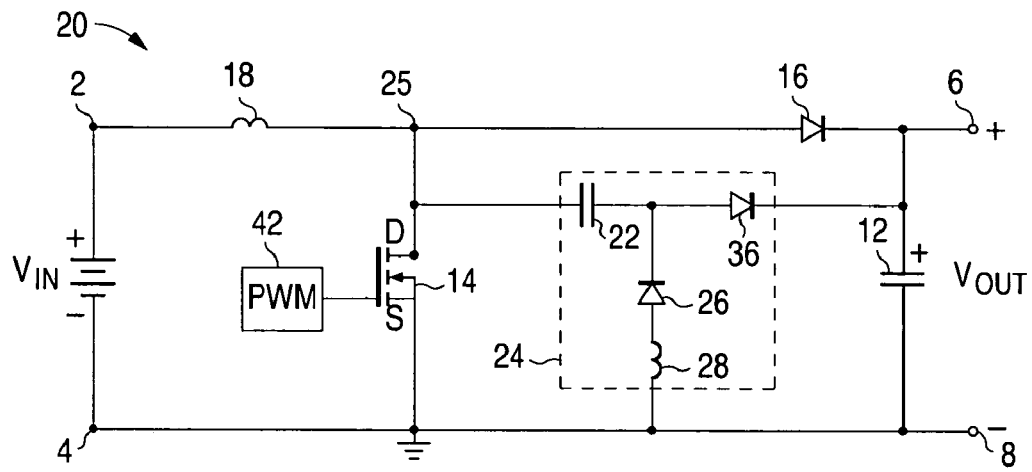
FIG. 2 is a diagram of a prior art boost converter topology including a snubber circuit.
Figure 3:
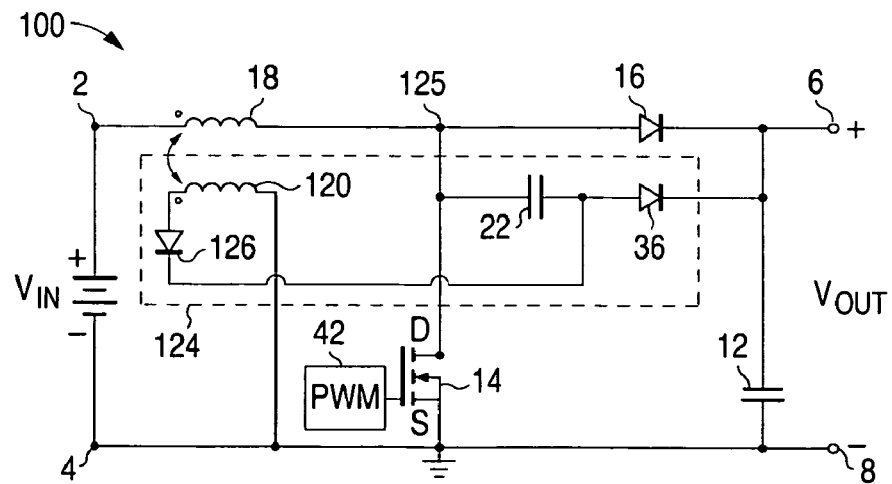
FIG. 3 is a schematic diagram of a preferred embodiment of the snubber circuit and boost converter topology according to present invention.

FIG. 3 is a schematic diagram of a preferred embodiment of the snubber circuit 124 and boost converter according to present invention. Boost converter 100 comprises a snubber circuit 124 added to the boost converter 10 of FIG. 1. The snubber circuit 124 is designed to suppress the spike generated at the drain of MOSFET 14 caused by the large current pulse and the leakage (parasitic) inductance in the circuit when MOSFET 14 is turned off and to transfer this energy to the output. The snubber circuit 124 includes a series combination of a capacitor 22 and a diode 36 connected across s diode 16. The capacitor 22 is connected at one end to the junction of the inductor 18 and the diode 16 at a node 125. Snubber circuit 124 includes a series combination of an inductor 120 and a diode 126 connected between the junction of capacitor 22 and the diode 36 and the negative output terminal 8. Inductor 120 is magnetically coupled to inductor 18 as shown in FIG. 3.

The operation of the snubber circuit 124 is now described in further detail. The voltage on resonant capacitor 22 with MOSFET 14 on, i.e., before the MOSFET 14 is turned off, is also referred to herein as $V_{c22on}$.

The voltage developed on the drain of MOSFET 14 spikes on MOSFET 14 turn off due to the pulse current flowing through MOSFET 14 and the parasitic inductance in the circuit. When the voltage at the drain terminal of MOSFET 14 reaches a threshold of $(V_{out}-V_{c22on})$, the current takes the path of capacitor 22, and diode 36 to $V_{out}$ because diode 36 is forward biased much earlier than diode 16 because of the voltage across capacitor 22 at turn on. Thus, the voltage on the drain of MOSFET 14 is clamped by $(V_{out}-V_{c22on})$. As current continues to flow through capacitor 22, it discharges until the voltage on capacitor 22 becomes $V_{c22off}$. Ideally, $V_{c22off}$ should be equal to zero volts since current will continue to flow through the path of capacitor 22 and diode 36 until the voltage at node 125 ramps up to $V_{out}$. The diode 16 is not an ideal diode, however, so time is needed for diode 16 to become forward biased. As a result, capacitor 22 will charge up to a $V_{c22off}$ greater than zero volts.

Figure 4:
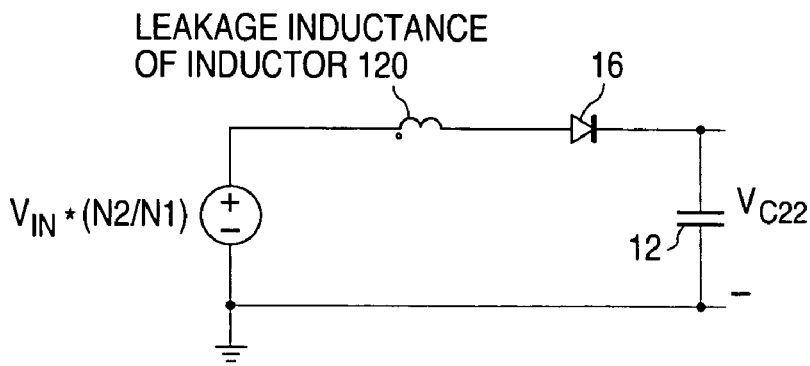

With MOSFET 14 turned on, the effective circuit is as shown in FIG. 4. On turn on, the voltage at node 125 goes to zero, which causes resonant capacitor 22 to be half resonant with the leakage inductance of inductor 120, thereby causing the polarity of the voltage on resonant capacitor 22 to be reversed. More specifically, the voltage on inductor 120 is set to $V_{in}*(N2/N1)$, where N2 is the number of turns of inductor 120, N1 is the number of turns of inductor 18, and N2/N1 is the turns ratio. Thus, the voltage applied to the resonant network becomes $V_{in}*(N2/N1)$. After the half resonant action, the voltage developed on capacitor 22 is $2*V_{in}*(N2/N1)+V_{c22off}$. As a result, $V_{c22on}$ is greater than that of $V_{c22off}$ by $2*V_{in}*(N2/N1)$. This voltage difference is due to the half resonant action and the inductor 120 being magnetically coupled to the main booster choke, i.e., inductor 18. The voltage across capacitor 22 is therefore well defined.

Figure 5:
FIG. 5 is a timing diagram that illustrates voltage waveforms at various points for the snubber circuit and boost converter topology in FIG. 3.

FIG. 5 is a timing diagram that illustrates voltage waveforms at various points for the boost converter in FIG. 3 for the following exemplary values: $V_{in}$=30 VDC, $V_{out}$=170 VDC, and the output power $P_o$=1000 W. The turns ratio, N2/N2, can less than 1 or greater than 1 for the circuit according to the present invention as a function of the requirements of a particular application. More specifically, the diode 36 will conduct earlier as the turns ratio N2/N1 increases, so as to clamp the spike on MOSFET 14 more effectively. An increase in the turn ratio N2/N1 does however, have the undesirable effect of causing the conduction time to increase for the path including capacitor 22 and diode 36. A drawback of the increased conduction time is that the increase causes the power loss associated with capacitor 22 and diode 36 to become significant. For the 1000 W exemplary embodiment, example, an 18:22 N1/N2 turns ratio is preferred for the 1000 W exemplary embodiment due to the combination of good spike clamping performance on the voltage of the drain terminal of MOSFET 14 and an acceptably small loss on capacitor 22 and diode 36.

In FIG. 5, waveform A is the drain source voltage, $V_{ds}$, of MOSFET 14 (100V/Division), waveform B is the voltage across inductor winding 120 (100V/Division), and waveform C is the voltage across the capacitor 22 (50V/Division). The waveforms illustrate that the capacitor 22 is charged to 25V when the MOSFET 14 turns off. Ideally, the voltage across capacitor 22 with MOSFET 14 in the off, nonconducting state, i.e., $V_{c22off}$, should be 0V if diode 16 was an ideal diode. Since diode 16 is not an ideal diode, time is needed for diode 16 to become forward biased. As a result, capacitor 22 will charge up to a $V_{c22off}$ greater than zero volts, e.g., 25V for the exemplary embodiment for which the timing is illustrated by the waveforms in FIG. 5.

With MOSFET 14 turned on, resonant capacitor 22 get half resonant with the leakage inductance of the inductor 120 and the voltage across resonant capacitor 22 reverses and becomes 75V. The actual value is less than the expected value of $2*V_{in}*(N2/N1)+V_{c22off}=79V$ due to losses for the resonant circuit and the MOSFET 14. As seen in FIG. 5, the voltage at the drain terminal of MOSFET 14 is clamped very effectively to be at a 210V peak.

Figure 6:
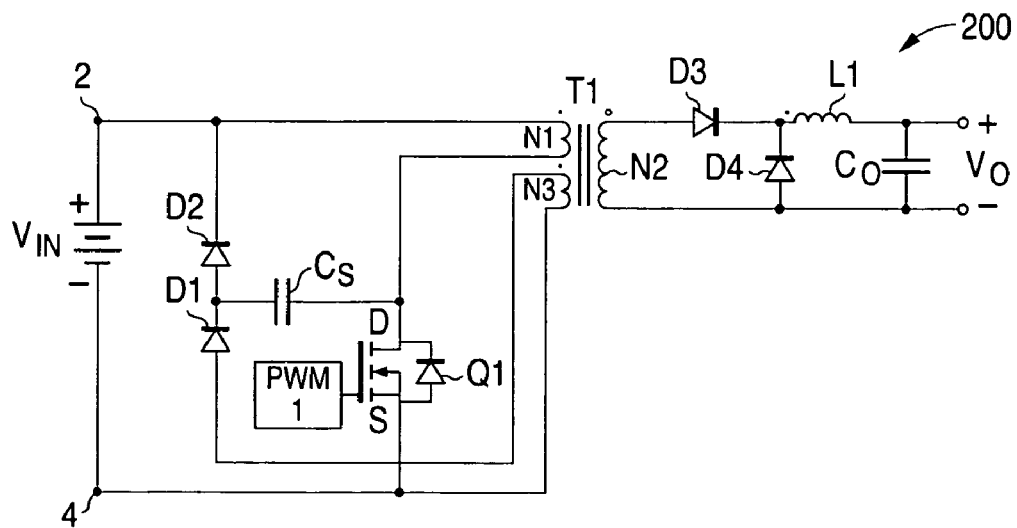
FIG. 6 is a schematic diagram of the snubber circuit for a forward converter topology according to an alternative embodiment of the present invention.

FIG. 6 is a schematic diagram of the snubber circuit and corresponding forward converter topology according to an alternative embodiment of the present invention. In operation, prior to the turn off of the MOSFET Q1, the voltage developed on capacitor Cs is $V_{cson}$. When the MOSFET Q1 turns off, the voltage developed on the drain of MOSFET Q1 increases due to the parasitic inductance. When the drain voltage reaches a threshold of $(V_{IN}-V_{cson})$, current takes the path of capacitor Cs, diode D2 to $V_{IN}$, so the voltage on the drain of MOSFET Q1 is clamped by $V_{IN}$. The voltage developed is $V_{csoff}$.

Figure 7:
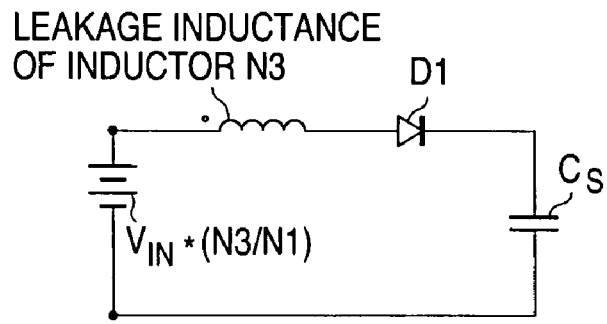

FIG. 7 is a schematic diagram of the equivalent effective circuit of FIG. 6 with the MOSFET Q1 turned on.

Figure 8:
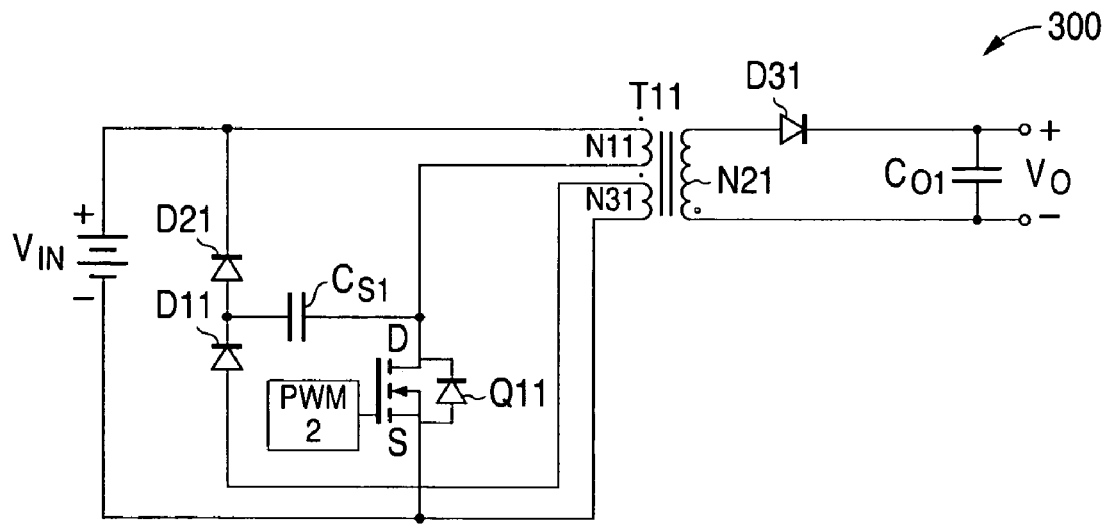
FIG. 8 is a schematic diagram of the snubber circuit for a flyback converter topology according to another alternative embodiment of the present invention.

FIG. 8 is a schematic diagram of the snubber circuit and corresponding flyback converter topology 300 according to another alternative embodiment of the present invention. In operation, prior to the turn off of the MOSFET Q11, the voltage developed on capacitor Cs1 is $V_{cs1on}$. When the MOSFET Q11 turns off, the voltage developed on the drain of MOSFET Q1 increases due to the parasitic inductance. When the drain voltage reaches a threshold of $(V_{IN}-V_{cs1on})$, current takes the path of capacitor Cs1 and diode D21 to $V_{IN}$, so the voltage on the drain of MOSFET Q11 is clamped by $V_{IN}$. The voltage for capacitor Cs1 with MOSFET Q11 in the off state is $V_{cs1off}$.

Figure 9:
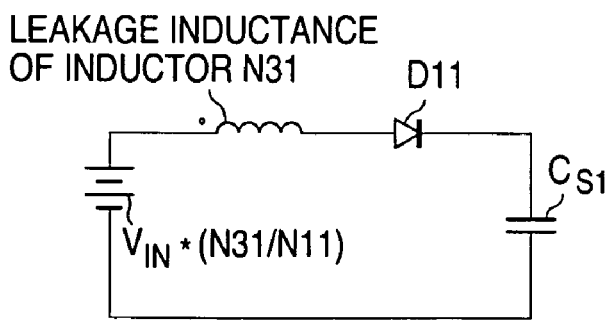

FIG. 9 is a schematic diagram of the equivalent effective circuit of FIG. 8 with the MOSFET Q11 turned on.

As described above, the present invention provides a snubber circuit and corresponding converter topology for reducing the voltage spike developed at the drain of the main MOSFET caused by the large current pulse and parasitic inductance of the circuit such that performance of the converter is substantially improved.

Having disclosed exemplary embodiments, modifications and variations may be made to the disclosed embodiments while remaining within the scope of the invention as described by the following claims.

What is claimed is:

1. A power converter having first and second input terminals where an input voltage is provided and first and second output terminals where the output DC voltage is provided, the converter comprising:
   a first inductor having a first number of winding turns and having one end connected to the first input terminal;
   a boost diode connected in series between the other end of said first inductor and said first output terminal;
   a first capacitor coupled across said first output terminal and said second output terminal;
   a switch alternately switched on and off as a function of a control signal for controlling current through said first inductor; said switch is connected between said second input terminal and a first node at the junction of said first inductor and said boost diode; and
   a snubber circuit comprising:
      a series combination of a second inductor magnetically coupled to said first inductor, a second diode and a third diode, said series combination connected across said output terminals; and, said second inductor having a second number of winding turns; and
      a resonant capacitor connected in series with said third diode between said first node and said first output terminal, wherein said second inductor and said resonant capacitor form a resonant circuit; and
   wherein said resonant capacitor's voltage is controlled at turn on of said switch as a function of the resonant action of said resonant circuit and the turns ratio of the windings of said first and second inductors.

2. The converter of claim 1, wherein said second diode has an anode connected to said second inductor and a cathode connected to the junction of said resonant capacitor and said third diode.

3. The converter of claim 1, wherein said control signal is provided by a control circuit for controlling the duty cycle of said switch.

4. The converter of claim 1, wherein said control circuit has a pulse width modulation controller.

5. The converter of claim 1, wherein said third diode has an anode connected to said resonant capacitor and a cathode connected to said first output terminal.

* * * * *